United States Patent
Gillot et al.

(10) Patent No.: US 9,264,922 B2
(45) Date of Patent: Feb. 16, 2016

(54) METHOD AND SYSTEM FOR ENSURING SERVICE CONTINUITY IN CASE OF A PROXY PROFILE GATEWAY FAILURE OR INTERRUPTION

(75) Inventors: David Gillot, Brussels (BE); John Yue Jun Jiang, Danville, CA (US)

(73) Assignee: MOBILEUM INC., Santa Clara, CA (US)

( * ) Notice: Subject to any disclaimer, the term of this patent is extended or adjusted under 35 U.S.C. 154(b) by 912 days.

(21) Appl. No.: 12/270,758

(22) Filed: Nov. 13, 2008

(65) Prior Publication Data

US 2009/0190468 A1    Jul. 30, 2009

Related U.S. Application Data

(63) Continuation-in-part of application No. 10/635,804, filed on Aug. 5, 2003, now Pat. No. 7,072,651, which is a continuation-in-part of application No. 11/979,537, filed on Nov. 5, 2007, which is a continuation-in-part of application No. 11/979,538, filed on Nov. 5, 2007, now abandoned, which is a continuation-in-part of application No. 11/280,862, filed on Nov. 17, 2005, now abandoned, which is a continuation-in-part of application No. 11/294,329, filed on Dec. 6, 2005, now abandoned, which is a continuation-in-part of application No. 11/711,681, filed on Feb. 28, 2007, which is a continuation-in-part of application No. 10/782,681, filed on Feb. 18, 2004, now Pat. No. 7,577,431, which is a continuation-in-part of application No. 11/700,964, filed on Feb. 1, 2007, which is a continuation-in-part of application No. 10/918,644, filed on Aug. 13, 2004, now abandoned.

(51) Int. Cl.
*H04W 4/00* (2009.01)
*H04W 24/04* (2009.01)
*H04W 8/30* (2009.01)
*H04W 88/16* (2009.01)

(52) U.S. Cl.
CPC ............... *H04W 24/04* (2013.01); *H04W 8/30* (2013.01); *H04W 88/16* (2013.01)

(58) Field of Classification Search
CPC ................................. H04W 8/12; H04W 8/18
USPC ........................ 455/432.3, 426.1, 424, 423
See application file for complete search history.

(56) References Cited

U.S. PATENT DOCUMENTS

| | | | | |
|---|---|---|---|---|
| 6,333,929 B1 * | 12/2001 | Drottar et al. | ........... | 370/362 |
| 6,628,649 B1 * | 9/2003 | Raj et al. | ........... | 370/360 |
| 7,496,090 B2 * | 2/2009 | Jiang | ........... | 370/354 |
| 2005/0192035 A1 * | 9/2005 | Jiang | ........... | 455/461 |
| 2008/0125116 A1 * | 5/2008 | Jiang | ........... | 455/433 |

* cited by examiner

*Primary Examiner* — Chuck Huynh
(74) *Attorney, Agent, or Firm* — Arent Fox LLP

(57) ABSTRACT

Aspects of the present invention relate to methods, systems and computer products that guarantee the availability of basic services to subscribers during the failure of a Proxy-Profile Gateway. An independent module equipped with monitoring probes for tracking the actual location of the end-customer, an interface for controlling the Gateway availability, and an active SS7 signaling interface are also provided, in order to initiate the recovery procedures, along with a database for storing the relevant information necessary to apply the restoration procedures.

16 Claims, 9 Drawing Sheets

METHOD AND SYSTEM FOR ENSURING SERVICE CONTINUITY IN CASE OF A PROXY PROFILE GATEWAY FAILURE OR INTERRUPTION

CROSS-REFERENCE TO RELATED APPLICATIONS

This application is a continuation-in-part of U.S. patent application Ser. No. 10/635,804 titled "Method And System For Cellular Network Traffic redirection," filed Aug. 5, 2003, now U.S. Pat. No. 7,072,651. It is also a continuation-in-part of U.S. patent application Ser. No. 11/979,537 titled "Method and system for providing roaming services to inbound roamers using visited network gateway location register," filed Nov. 5, 2007, and U.S. patent application Ser. No. 11/979,538 titled "Method and system for providing roaming services to outbound roamers using home network Gateway Location Register," filed Nov. 5, 2007 now abandoned. It is also a continuation-in-part of U.S. patent application Ser. No. 11/280,862 titled "Border Roaming Gateway," filed Nov. 17, 2005 now abandoned, and of U.S. patent application Ser. No. 11/294,329 titled "Scalable Messaging Forwarding," filed Dec. 6, 2005 now abandoned, and of U.S. patent application Ser. No. 11/711,681 titled "Method and System for Applying Value Added Services on Messages Sent to a Subscriber's Mobile Communication," filed Feb. 28, 2007, and of U.S. patent application Ser. No. 10/782,681 titled "Providing multiple MSISDN numbers in a mobile device with a single IMSI," filed Feb. 18, 2004 now U.S. Pat. No. 7,277,431, and of U.S. patent application Ser. No. 11/700,964 titled "Method and System for Keeping all Phone Numbers Active While Roaming With Diverse Operator Subscriber Identity Modules," filed Feb. 1, 2007, and of U.S. patent application Ser. No. 10/918,644 titled "Multiple IMSI with Multiple/Single MSISDN (MIMM) Service in a Single SIM for Multiple Roaming Parties," filed Aug. 13, 2004 now abandoned. All of these related patent applications are incorporated herein by this reference in their entirety herein.

BACKGROUND OF THE INVENTION

Many mobile operators today are deploying or have deployed signaling gateway based value-added services in their core network. These signal gateways often need to store the user profile for delivering the expected services. Since these gateways play a role of HLR in regard to VLR and VLR in regard to HLR, it is hereafter termed as "Proxy Profile Gateway".

As is know in the art (see, e.g., U.S. patent application Ser. No. 10/782,681 titled "Providing multiple MSISDN numbers in a mobile device with a single IMSI," filed Feb. 18, 2004, U.S. patent application Ser. No. 11/700,964 titled "Method and System for Keeping all Phone Numbers Active While Roaming With Diverse Operator Subscriber Identity Modules," filed Feb. 1, 2007, and U.S. patent application Ser. No. 10/918,644 titled "Multiple IMSI with Multiple/Single MSISDN (MIMM) Service in a Single SIM for Multiple Roaming Parties," filed Aug. 13, 2004), Signal Gateways for multiple numbers have been developed and deployed for mobile operators to offer multiple country numbers for a subscriber with a single IMSI of a home operator, multiple numbers of the same operator for a subscriber with a single IMSI, multiple devices or IMSI with a single number of the same operator, multiple devices and multiple country numbers for a subscriber of a home operator, etc. In all these solutions, the signal gateway doubles as a virtual HLR to the real VLR and a virtual VLR to the real HLR. This is to ensure that the signal gateway can control and offer value added services for the subscribers, located either at a home network or roaming. However, the above approach suffers from a serious drawback in that mobile terminated services (e.g., calls, and SMS) will not be available to subscribers when the gateway goes down until the subscribers change VMSC/VLR locations. Although the intended service offered by the signal gateway may not be available, it is critical that the subscribers continue to have basic services available.

U.S. patent application Ser. No. 11/979,537 titled "Method and system for providing roaming services to inbound roamers using visited network gateway location register," filed Nov. 5, 2007 and U.S. patent application Ser. No. 11/979,538 titled "Method and system for providing roaming services to outbound roamers using home network Gateway Location Register," filed Nov. 5, 2007, the entirety of each of which is incorporated by this reference herein, propose an advanced gateway location register on the GLR standard [3GPP 23119] to deal with the fail-over effects of GLR and to handle stuck handsets due to traffic steering. A Gateway Location Register is a core network element that aims to optimize the signaling exchange between different networks. It is fully described in the ETSI standards (ETSI-TS.129.120 and TS.123.119). It is usually deployed in a VPMN network and doubles as a virtual HLR to the real VLR and a virtual VLR to the real HLR. These disclosures use a one-on-one mapping between a GLR GT and a real VLR GT for the virtual VLRs to the HPMN HLRs and another one-on-one mapping between a GLR GT and a real HLR GT for the virtual HLRs to the VPMN VLRs. This helps at least for an inbound roamer to receive MT services when the GLR goes down, as long as the roamer has not changed VLR/VMSC location since its first registration with the VPMN network. Of course, subsequent to GLR going down, any new VMSC/VLR changes will naturally restore the MT service. However, these disclosures do not entirely solve the problem of an inbound roaming receiving MT services when the GLR goes down, even though the roamer has changed VLR/VMSC location since its first registration with the VPMN network.

It is recognized that when the proxy gateway goes down, some enhanced services offered by the gateway will not be available to subscribers. However at least, the subscribers' basic services (excluding the enhanced ones provided by the gateway) should still be available. Therefore, there remains a need in the art for improving the state of the art for assuring the availability of the basic subscriber services, even during a downtime of the Proxy Gateway. Further, there remains a need in the art for improving the mechanisms for stopping a Proxy-Profile Gateway activity, as may be required for operations and maintenance purposes.

SUMMARY OF THE INVENTION

Aspects of the present invention overcome the above identified problems, as well as others, by providing systems, computer products, and that guarantee the availability of the basic services of subscribers during the failure of a Proxy-Profile Gateway.

Aspects of the present invention provide a secured mechanism for stopping a Proxy Profile Gateway traffic management in case of operations and maintenance activity.

Aspects of the present invention provide an independent system that is equipped with monitoring probes for tracking the actual location of the end-customer, an interface for controlling the Gateway availability, an active SS7 signaling interface in order to initiate the recovery procedures and a database for storing the relevant information necessary to apply the restoration procedures. The term "external module" is used interchangeably herein with the term "ProxySaver."

In accordance with aspects of the present invention, the ProxySaver sends a sequence of signaling messages to each affected subscriber so to generate a new location update message to ensure both real VLR and real HLR have each other's respective information so that the subscriber can at least have the basic services available when the Proxy-Profile Gate goes down. Aspects of the present invention improve on the technique disclosed in U.S. Pat. No. 7,072,651, where a MT call signaling message is generated to hope for a location update. However, this earlier art is limited to the case where there is more than one VMSC for a VLR, which is generally not the case today. Aspects of the present invention deal not only with the virtual HLR issues in the real VLR, but also with all other situations in which the problem arises.

Aspects of the present invention are applicable not only to inbound and outbound roamers, but to local subscribers as well. Therefore, the term "subscriber," as used herein refers to a generic subscriber, not only limited to home subscribers, and can denote inbound and outbound roamers.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

For a more complete understanding of the present invention, the needs satisfied thereby, and the objects, features, and advantages thereof, reference now is made to the following description taken in connection with the accompanying drawings.

DETAILED DESCRIPTION

A Proxy Profile Gateway, such as a Gateway Location Register (Gateway) or a Single IMSI Multiple MSISDN (SIMM) system, stores user profile information in order deliver value-added services to the hosting operator. Typically, the Proxy Profile Gateway may aim to reduce the number of signaling exchanges between networks by caching the location procedures between VLRs of a distant PLMN or offer multiple MSISDN to a subscriber without the need of deploying several SIM Cards or possessing multiple handsets.

In all cases, the Proxy Profile Gateway (interchangeably referred to herein as "PPG," Gateway, and Proxy-Gateway) acts as a proxy-MSC-VLR from a HLR perspective and as a proxy-HLR from a MSC-VLR perspective.

The PPG can be integrated in the hosting PMN using different routing rules.

The messages, referring to operations involving the HPMN HLR, may be routed towards the PPG by modifying the destination addresses or by applying tunneling mechanisms, e.g., adapting the Translation Type number associated to the Global Titles and encapsulating the messages in IP protocols, among other mechanisms.

The approach of replacing the network nodes Global Titles by Gateway-managed addresses is denominated the 'dummy GT' method. The benefit of modifying the addresses has been shown in U.S. patent application Ser. No. 11/979,537 titled "Method and system for providing roaming services to inbound roamers using visited network gateway location register," filed Nov. 5, 2007 and U.S. patent application Ser. No. 11/979,538 titled "Method and system for providing roaming services to outbound roamers using home network Gateway Location Register," filed Nov. 5, 2007.

Figure 1:
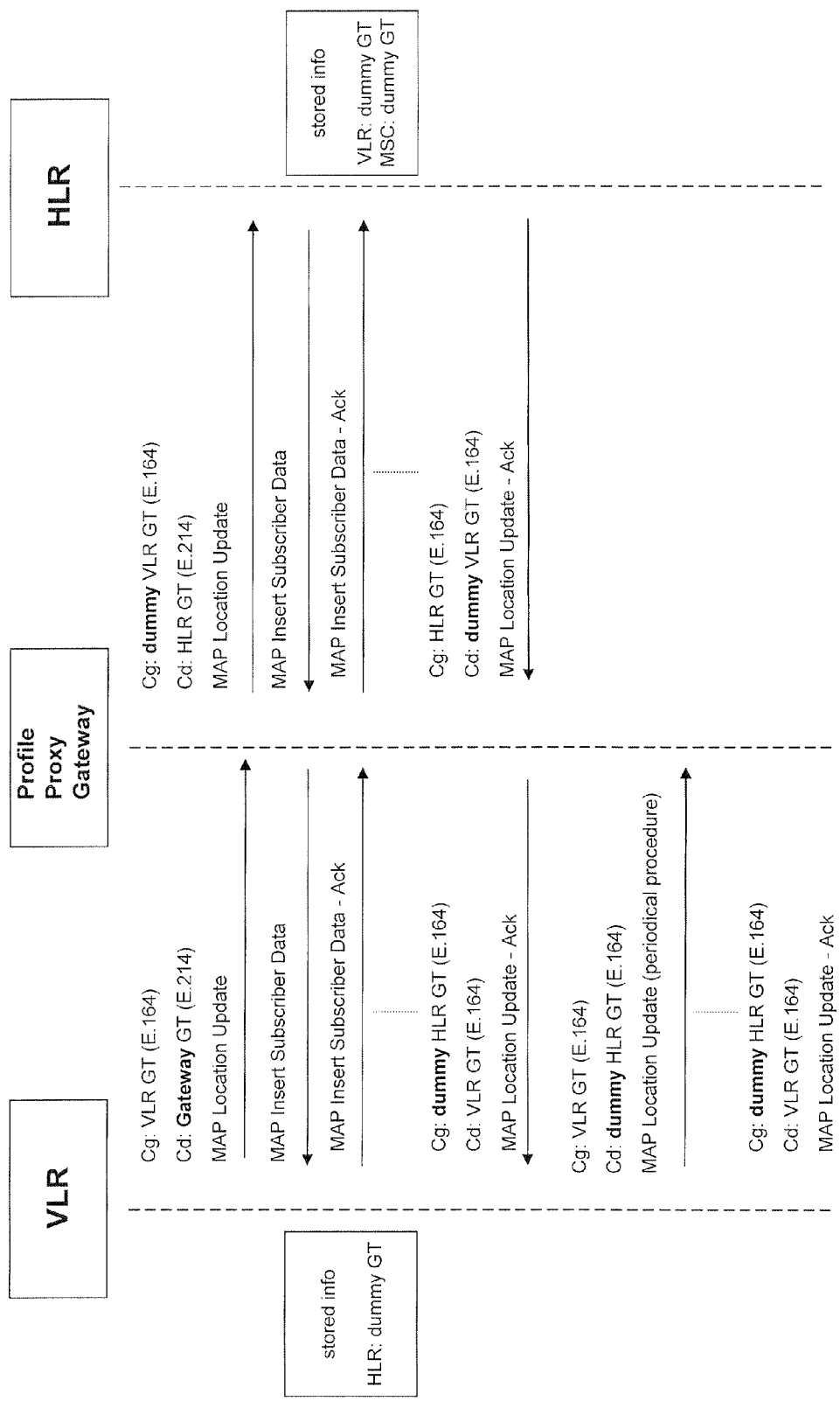
FIG. 1 illustrates an exemplary flow diagram for a gateway based on a Dummy Global Title integration, in accordance with aspects of the present invention.
Figure 2:
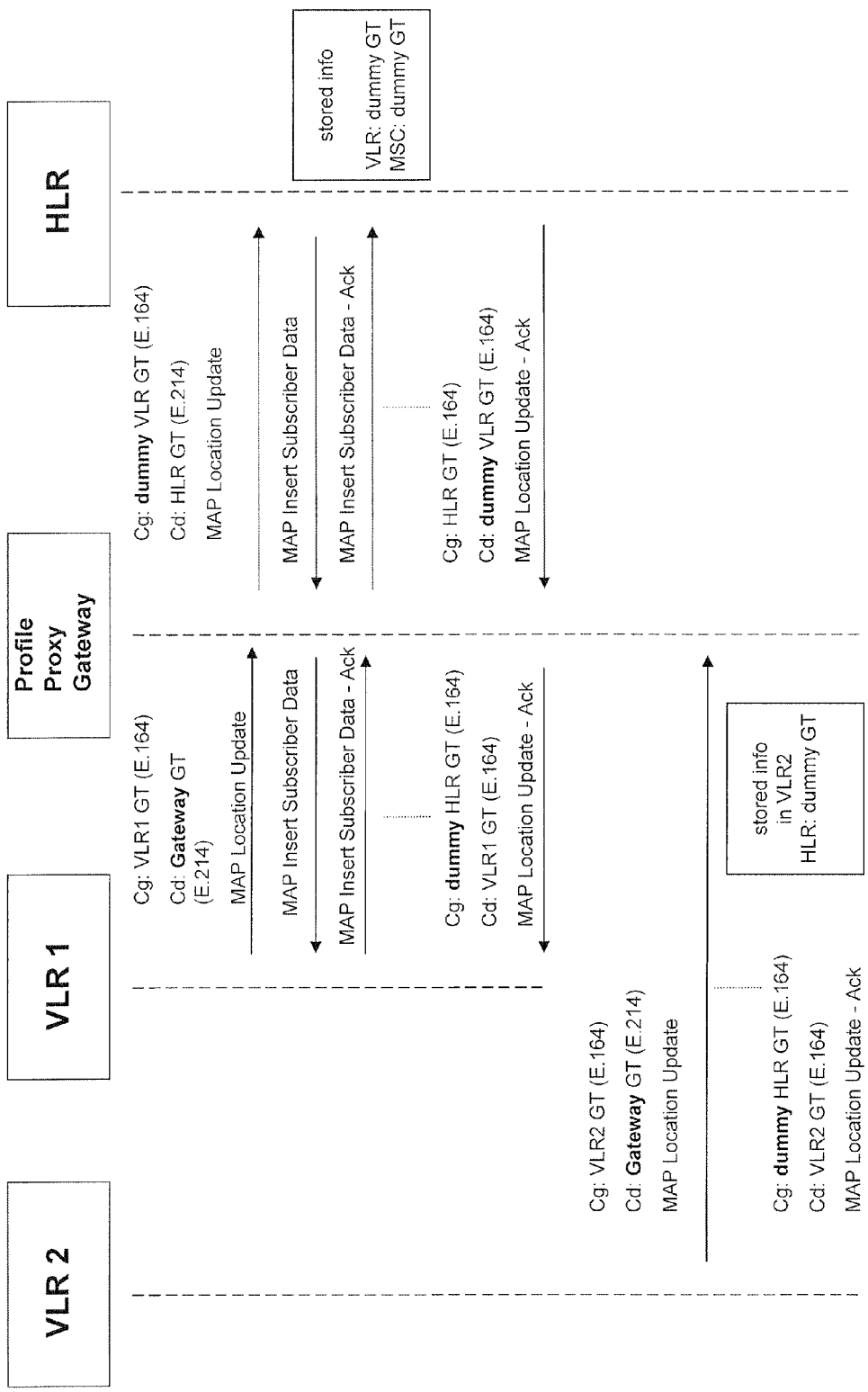
FIG. 2 illustrates an exemplary flow diagram of Gateway based call flow in case of VLR change (Dummy Global Title integration), in accordance with aspects of the present invention.

FIGS. 1 and 2 detail how the Update Location procedures are optimized when the dummy GT method is used. FIGS. 1 and 2 also show what end-point address information is stored in VLR and HLR. FIG. 1 shows the UL procedure in a single VLR and how the periodical UL procedure takes place after the PPG is involved in the transactions.

FIG. 2 shows how the UL procedure is cached when the inbound end-user moves from VLR1 to VLR2.

Alternatively, the methods that do not require any modification of the Global Title addresses, e.g., based on Translation Type modification are referred to as "Tunneling" methods.

Figure 3:
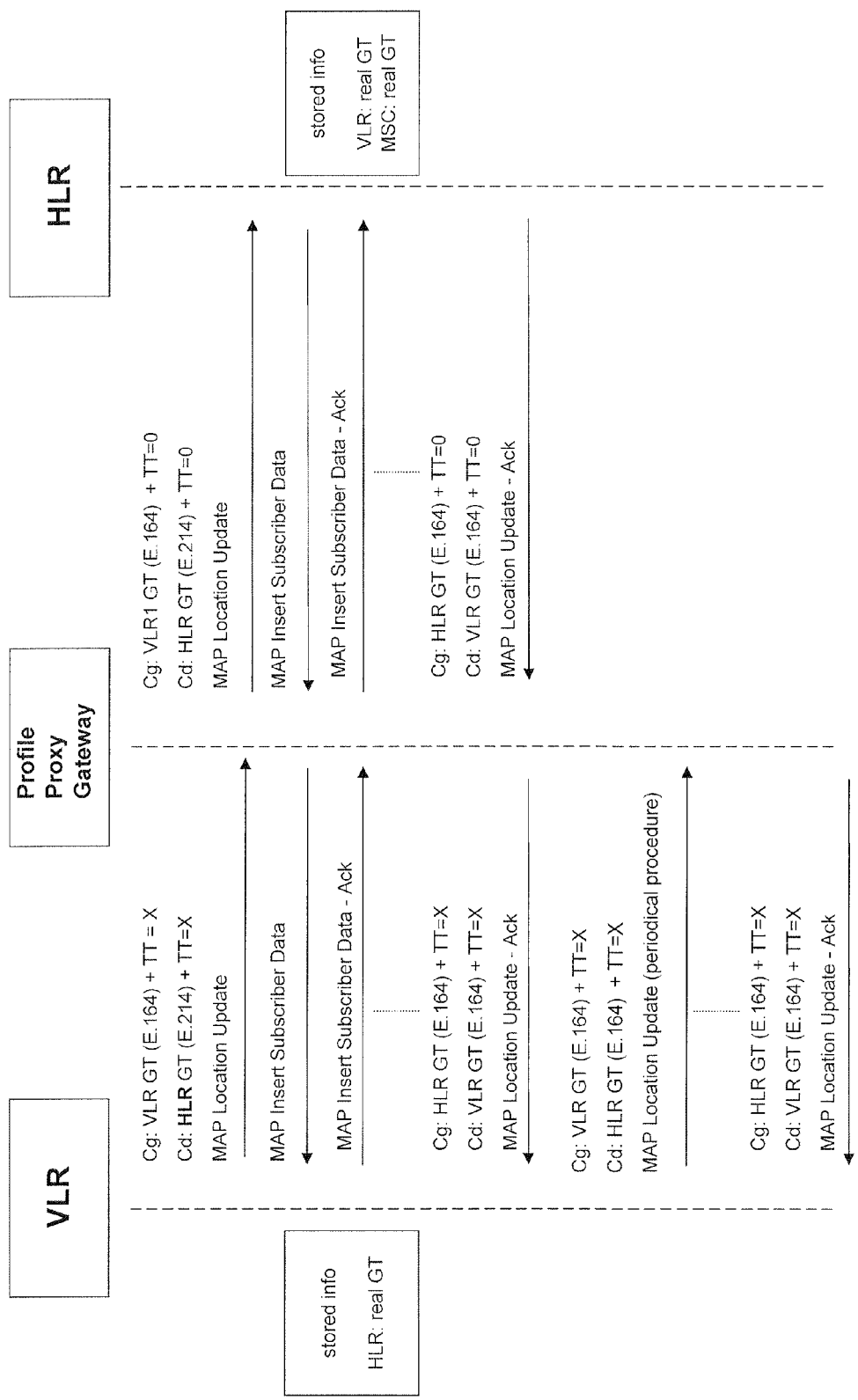
FIG. 3 illustrates an exemplary flow diagram for a Gateway based on a GT Translation Type integration), in accordance with aspects of the present invention.
Figure 4:
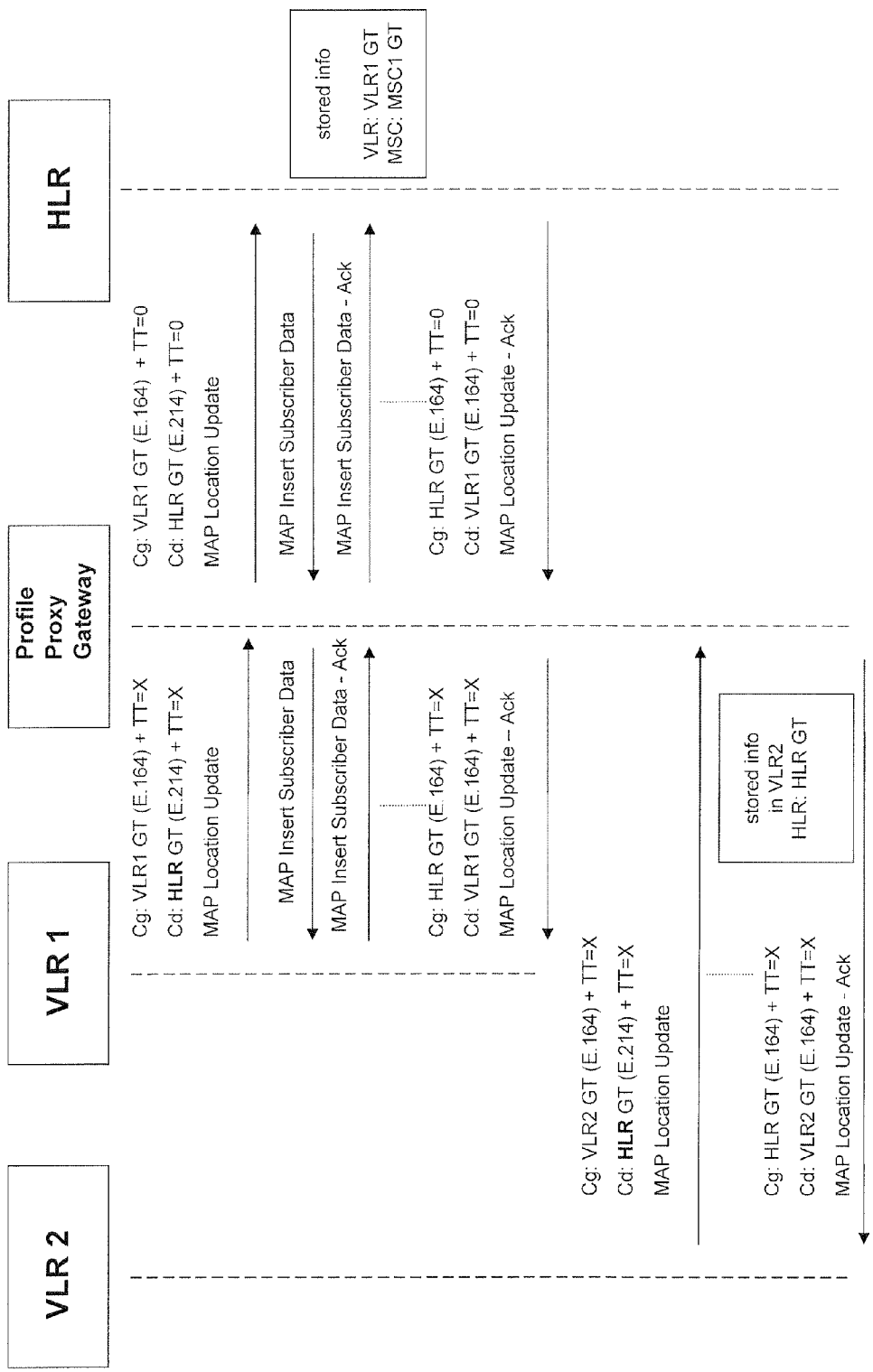
FIG. 4 illustrates an example flow diagram of Gateway based call flow in case of VLR change (GT Translation Type), in accordance with aspects of the present invention.

FIGS. 3 and 4 show, similarly to the FIGS. 1 and 2, how the PPG interacts and what information is recorded at the end-point network node in the case of a Tunneling approach. Potential Issues Due to an Unavailable Profile Proxy Gateway FIGS. 5 and 6 detail the generic implementation of a PPG in a network.

The analysis is split into 2 sub-sections, as the routing design may have an impact on the current state of the art limitations. Three cases must be evaluated in case of PPG unavailability:

1. no end-user movement before the Gateway unavailability: the end-user remains attached to the same VLR;

2. an end-user movement before the Gateway unavailability; and 3. an end-user movement after the Gateway unavailability.

For each of the case, the impact on the service must studied for the Mobile-Originated activity (e.g., initiation of a voice call or a SMS) or for the Mobile-Terminated activity (e.g. reception of a voice call or a SMS).

Dummy GT—Gateway Unavailability Analysis

The operator decides to use dummy GT when establishing dialogues between the Gateway and the other network nodes. It defines VLR dummy GT and HLR dummy GT. This architecture is presented in FIGS. 1 and 2.

The operator defines dummy GT for each of its VLR. The dummy GT—real VLR GT mapping may be based on straightforward numbering modification e.g. real VLR+CCNDC000xyz–dummy GT+CCNDC100xyz.

Once the Profile Proxy function activated, the HLR records the dummy VLR after the successful processing of the first update location.

Similarly, a Global Title modification is also applied to the HLR address. The mapping between the dummy and real is generally dynamic as the Proxy Gateway may not always be aware of the HLR addresses that its Proxy Gateway may face, mainly in the case of roaming value-added services.

In order to determine the role of the ProxySaver, it is necessary to review the Mobile-Terminated scenario and Mobile-Originated scenario:

1. Mobile-Terminated Scenario:
No End-User Movement Before the Gateway Unavailability: The End-User Remains Attached to the Same VLR:

The HLR may acquire MT-related information (e.g., send the MAP Provide Roaming Number message) by polling the network operator, using the dummy GT address.

The operation can successfully executed at condition that the network operator is able to define, for each of the dummy VLR GT, a second route that points to the corresponding actual VLR.

End-User Movement Before the Gateway Unavailability:

The end-user moves from VLR1 to VLR2, while the Gateway is up and running. The HLR has recorded the dummy GT of VLR1, since the subsequent movements are cached by the Gateway.

The HLR may acquire MT-related information (i.e., send the MAP Provide Roaming Number message) by polling the network operator, using the dummy GT VLR1 address.

At reception of the MAP PRN, the VLR1 may provide a MSRN and invoke a restoration procedure. The call may be unsuccessfully connected since the end-user is not under coverage of the MSC/VLR1. At best, a Call Forward under Out-of-Reach condition takes place.

In the case of a SMS-MT, the restoration procedure is not invoked and the MSC/VLR returns an "Absent Subscriber" error to the Home SMS-C.

This demonstrates that there is a need for improving the state of the art in this scenario.

End-User Movement after the Gateway Unavailability:

In this case, the network operator STP detects the unavailability of the Gateway at the time the end-user moves. The Update Location messages are directly routed to the HLR, which in return records the actual and latest VLR location. It is assumed that the VPMN is able to detect the Gateway unavailability and route the message to the HPMN E.214 MGT. For example, the VLR can use a "prefix+E.214 MGT" for routing to the message to the Gateway. In case of failure, the STP strips the prefix away and route the message to the HLR E.214 on it secondary route.

The MT scenario takes place seamlessly.

2. Mobile-Originated scenario:
No End-User Movement Before the Gateway Unavailability. End-User Remains Attached to the Same VLR:

The first successful location update initiated by a VLR is performed using the E.214 (i.e., IMSI-derived address) MGT of the roaming partner. However, the VLR stores the E.164 address of the responding HLR and the subsequent interactions between the VLR and the HLR are based on this address. In the Gateway context, the VLR-recorded information is the dummy HLR GT.

As previously indicated, the dummy HLR address may be associated dynamically by the Gateway. Indeed it is unlikely the VPMN knows in advance all the real HLR GT of all its roaming partners, in the case of roaming-related services.

Therefore, the dummy GT allocation is rather done on the fly. The STP cannot be configured in advance to map the dummy GT and the real GT of the HLR.

In case the VLR needs to contact the HLR, it uses the stored E.164 address. The subsequent interactions can end-user initiated (e.g. Supplementary Service interaction, USSD interaction) or VLR-initiated (e.g. for a periodical Update Location, for requesting authentication parameters, notifying HLR readiness for receiving SMS, etc.). In the case of Gateway unavailability this may fail, as the dummy E.164 GT cannot be mapped to the original HLR E.164 dynamically at the STP level.

One resolution would be to fall back to the E.214 address on the STP secondary route. However, this requires specific address-modification capability at the STP level since it must recreate the SCCP E.214 address based on the end-user IMSI information in the MAP message part.

If this is not the case, authentication failures may occur after the inbound end-user has used all the previously received authentication triplets, for example. USSD-based services will also be affected—typically USSD call-back services for prepaid roamers.

This demonstrates that there is a need for improving the state of the art in this scenario.

End-User Movement Before the Gateway Unavailability:

This scenario highlights similar issues as the ones presented in the previous section, and also demonstrates that the need for enhancing the state of the art.

End-User Movement after the Gateway Unavailability:

In this case, the network operator STP detects the unavailability of the Gateway at the time the end-user moves. The Update Location messages are directly routed between the VLR and HLR, which in return records the actual and latest location information. The MO scenario takes place seamlessly.

From the previous analysis, we see that there is a need for both MO and MT scenario in order to secure the roaming services in the context of an implementation based on a Dummy GT configuration.

The same analysis in the context of a Tunneling implementation is provided below.

Tunneling Method—Gateway Unavailability Analysis

The operator decides to use a Tunneling Method (e.g. a Translation Type modification approach) for establishing dialogues between the Gateway and the other network nodes. This architecture is presented in FIGS. 3 and 4, as previously indicated. In this scenario, the VLR and HLR addresses are recorded transparently respectively in the HLR and the VLR.

In order to determine the role of the ProxySaver, it is necessary to review the limitations of the current state of the art in the context of a Mobile-Terminated scenario and Mobile-Originated scenario:

1. Mobile-Terminated Scenario:
No End-User Movement Before the Gateway Unavailability: the End-User Remains Attached to the Same VLR:

The HLR will intend to get MT-related information (e.g. send the MAP Provide Roaming Number message) by polling the network operator, using the real GT address.

The operation can successfully executed at condition that the network operator is able to define a second route that points to the corresponding actual VLR.

End-User Movement Before the Gateway Unavailability:

The end-user moves from VLR1 to VLR2 while the Gateway is up and running. The HLR has recorded the real GT of VLR1, since the subsequent movements are cached by the Gateway.

The HLR will intend to get MT-related information (i.e. send the MAP Provide Roaming Number message) by polling the network operator, using the GT VLR1 address.

At reception of the MAP PRN, the VLR1 will invoke provide a MSRN and a restoration procedure. The call will be unsuccessfully connected since the end-user is not under coverage of the MSC/VLR1. At best, a Call Forward under Out-of-Reach condition takes place.

In the case of a SMS-MT, the restoration procedure is not invoked and the MSC/VLR returns an "Absent Subscriber" error to the Home SMS-C.

This demonstrates that there is a need for improving the state of the art in this scenario.

End-User Movement after the Gateway Unavailability:

In this case, the network operator STP detects the unavailability of the Gateway at the time the end-user moves. The Update Location messages are directly routed to the HLR, which in return records the actual and latest VLR location. The MT scenario takes place seamlessly.

2. Mobile-Originated Scenario:

No End-User Movement Before the Gateway Unavailability: the End-User Remains Attached to the Same VLR:

The first successful location update initiated by a VLR is performed using the E.214 (i.e., IMSI-derived address) MGT of the roaming partner. However, the VLR stores the E.164 address of the responding HLR and the subsequent interactions between the VLR and the HLR are based on this address.

Because the Tunneling approach enables the storage of the HLR addresses transparently, i.e., the VLR always contains the real HLR address of the end-user.

The unavailability of the Gateway has no impact for reaching the actual HLR under the assumption that a second route is defined and available for reaching the end-user's HLR.

End-User Movement Before the Gateway Unavailability:

As above, it appears that there is no impact on this scenario when using the translation type approach.

End-User Movement after the Gateway Unavailability:

In this case, the network operator STP detects the unavailability of the Gateway at the time the end-user moves. The Update Location messages are directly routed to the HLR, which in return records the actual and latest VLR location. The MO scenario takes place seamlessly.

Description of the ProxySaver

The ProxySaver is an independent system that is equipped with monitoring probes for tracking the actual location of the end-customer, an interface for controlling the Gateway availability, an active SS7 signaling interface in order to initiate the recovery procedure and a database for storing the relevant information necessary to apply the restoration procedure.

The ProxySaver monitors the signaling links between
the STP and the Proxy-Gateway:
This enables the collection of the required information for the proxied-profiles, and enable storing, for each subscriber that is controlled by the proxy: the IMSI, MSIDN, actual VLR, MSC and HLR and the proxy VLR, MSC, and HLR addresses.
the operator's STPs and the HLRs:
This enables the ProxySaver to track movements of customer during a recovery procedure and to optimize it accordingly. As shown above, users getting attached to a new MSC/VLR after a GLR failure are not subject to MO/MT service availability.

This also enables tracing the completion of the restoration procedure and detecting the procedure failure (e.g., in case of Steering of Roaming applied by the Home Operator, temporary SS7 connectivity issue). In case of unsuccessful procedure completion, the ProxySaver can re-initiate it.

Detailed Procedure of ProxySaver for Restoring the Actual Addresses in the VLR and HLR Depending on the technical system architecture, the following issues may identified in case of GLR failure: a) resulting from the MSC/VLR address recorded in the HLR; and b) resulting from the HLR address recorded in the VLR.

Dummy GT Situation

Addresses stored in the VLR and in the HLR must be modified. It may by invoking an Update Location procedure from the VLR where the end-user is located. However, because the Update Location cannot be performed using the E.164 dummy address stored in the system, it is necessary to develop a strategy that erases the subscriber information.

The ProxySaver sends a MAP_CANCEL_LOCATION in order erase temporarily the user. Subsequently the ProxySaver sends a MAP_PROVIDE_ROAMING_NUMBER in order to restore the user profile in the actual VLR. Because the user profile was deleted from the VLR with the MAP CANCEL LOCATION, the VLR may initiate the MAP_RESTORE_DATA procedure with the E.214 address and therefore, the dialogue with the HLR will be established seamlessly.

As mentioned in 123.007, the VLR will now have the user profile in its register. The associated flags "Subscriber Information Confirmed by HLR" and "Location Information Confirmed in HLR" are marked as "Confirmed" while the "Confirmed by Radio Contact" set to "Not Confirmed."

Once the profile restoration is completed, the ProxySaver sends MAP_RESET to the VLR in order to re-initialize the "Location Information Confirmed in HLR" to "Not Confirmed."

There is no modification of the "Subscriber Data confirmed by HLR" and the "Confirmed by Radio Contact" flag status.

The ProxySaver may initiate a Mobile-Terminated Short Message, a Subscriber Location Request or a Network-Initiated USSD command towards the real MSC hosting the end-user.

At reception of the MAP_MT_FORWARD_SM or MAP_PROVIDE_SUBSCRIBER_LOCATION or MAP_PROCESS_UNSTRUCTURED_SS_REQUEST at the real MSC, a paging occurs and upon successful paging procedure completion, a MAP_PROCESS_ACCESS_REQUEST is sent from the MSC to the VLR. Consequently, the VLR checks at reception of the MAP_PROCESS_ACCESS_REQUEST the state of the "Location Information Confirmed in HLR". As the flag is set to "Not Confirmed", the VLR initiates an Update Location procedure which results in the recording of the actual VLR/MSC address information in the HLR and the actual HLR address information in the VLR.

Figure 5:
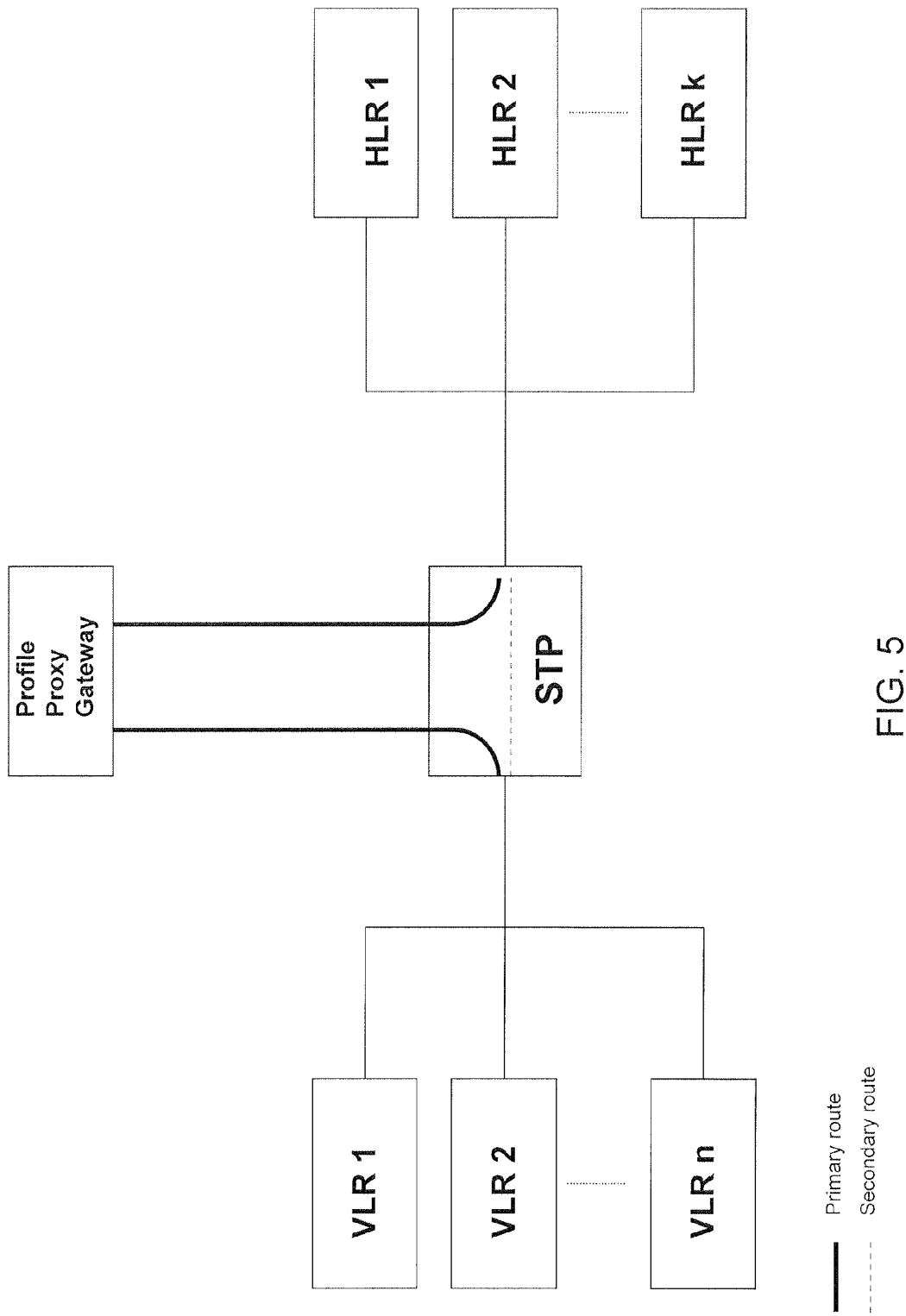
FIG. 5 illustrates an example Profile Proxy Gateway Generic Network Integration, in accordance with aspects of the present invention.
Figure 6:
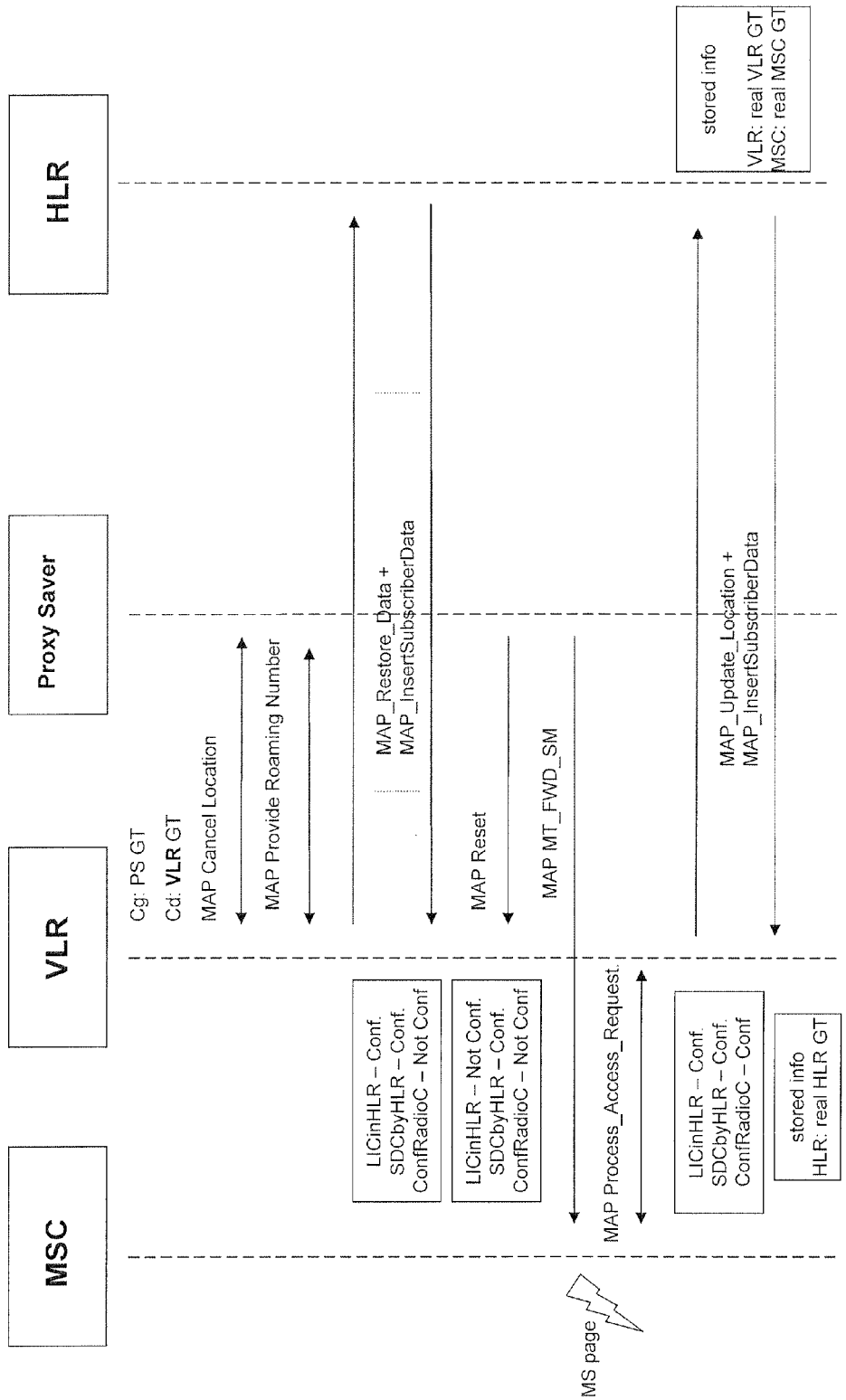
FIG. 6 illustrates an example Combined VLR and HLR restoration procedure, in accordance with aspects of the present invention.

This procedure is illustrated in FIGS. 5 and 6.

Tunneling Procedures

As noted in the Gateway failure discussion, the tunneling-relation restoration procedure only needs to modify the VLR/MSC information stored in the HLR. This is due to the end-point transparency offered by this kind of implementation.

Two approaches are proposed for solving the issue. The first is completely managed by the ProxySaver, while the second is initiated by the ProxySaver and then handled by the VLR hosting the end-user.

While both approaches solve the issue with the same effectiveness, dimensioning issue may lead the operator to prefer one approach to the other.

Method 1: UL Messaging (Full ProxySaver Management)

The objective of this operation is to modify the VLR and MSC address stored in the HLR.

When needed, the ProxySaver fires an Update Location to the real HLR of the end-user. While the addressing parameters (SCCP Calling Party) refer to the ProxySaver address, the message content indicates the real VLR/MSC addresses of the node hosting the user.

Figure 7A:
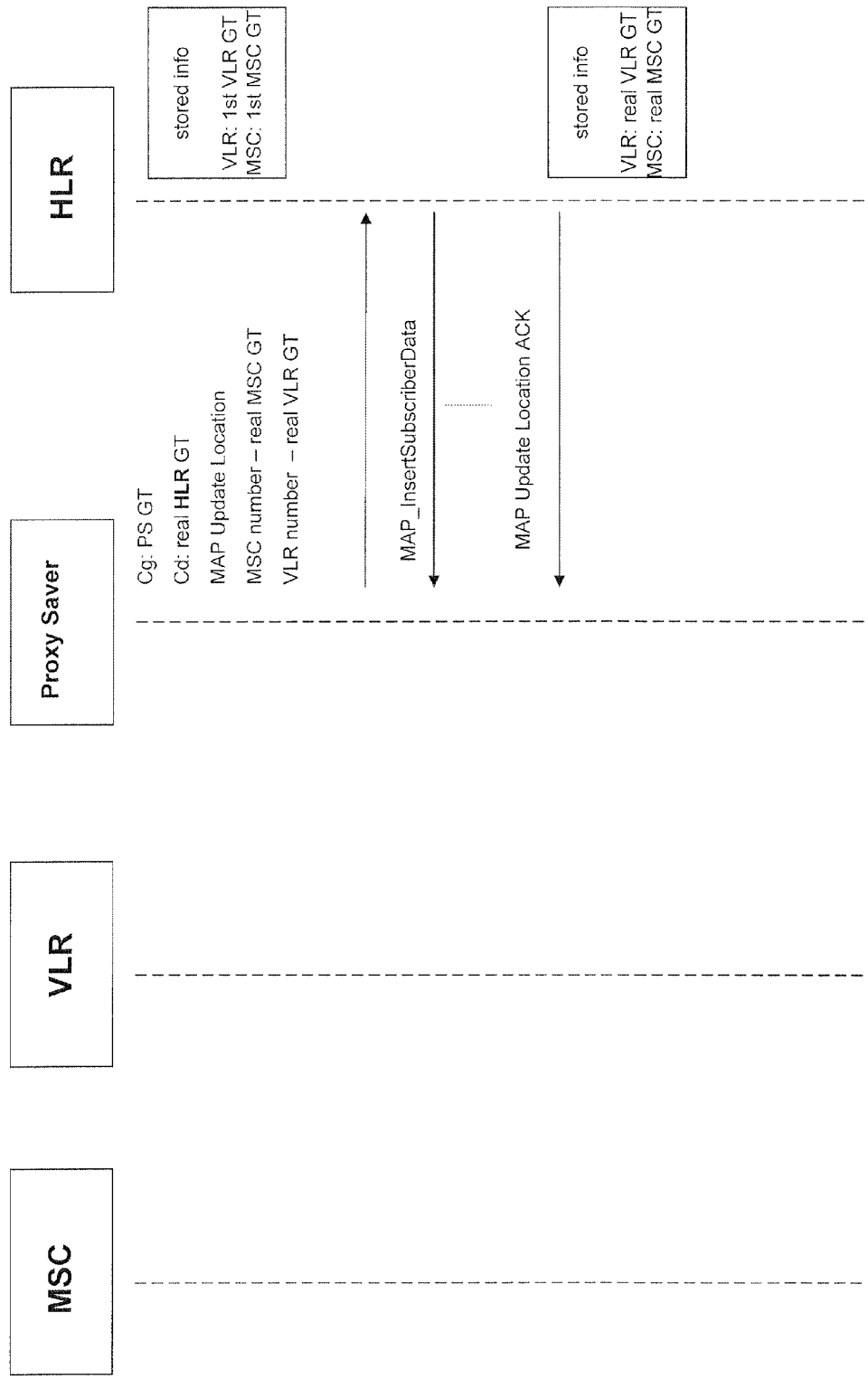
FIG. 7A illustrates an example ProxySaver-managed HLR restoration procedure, in accordance with aspects of the present invention.
Figure 7B:
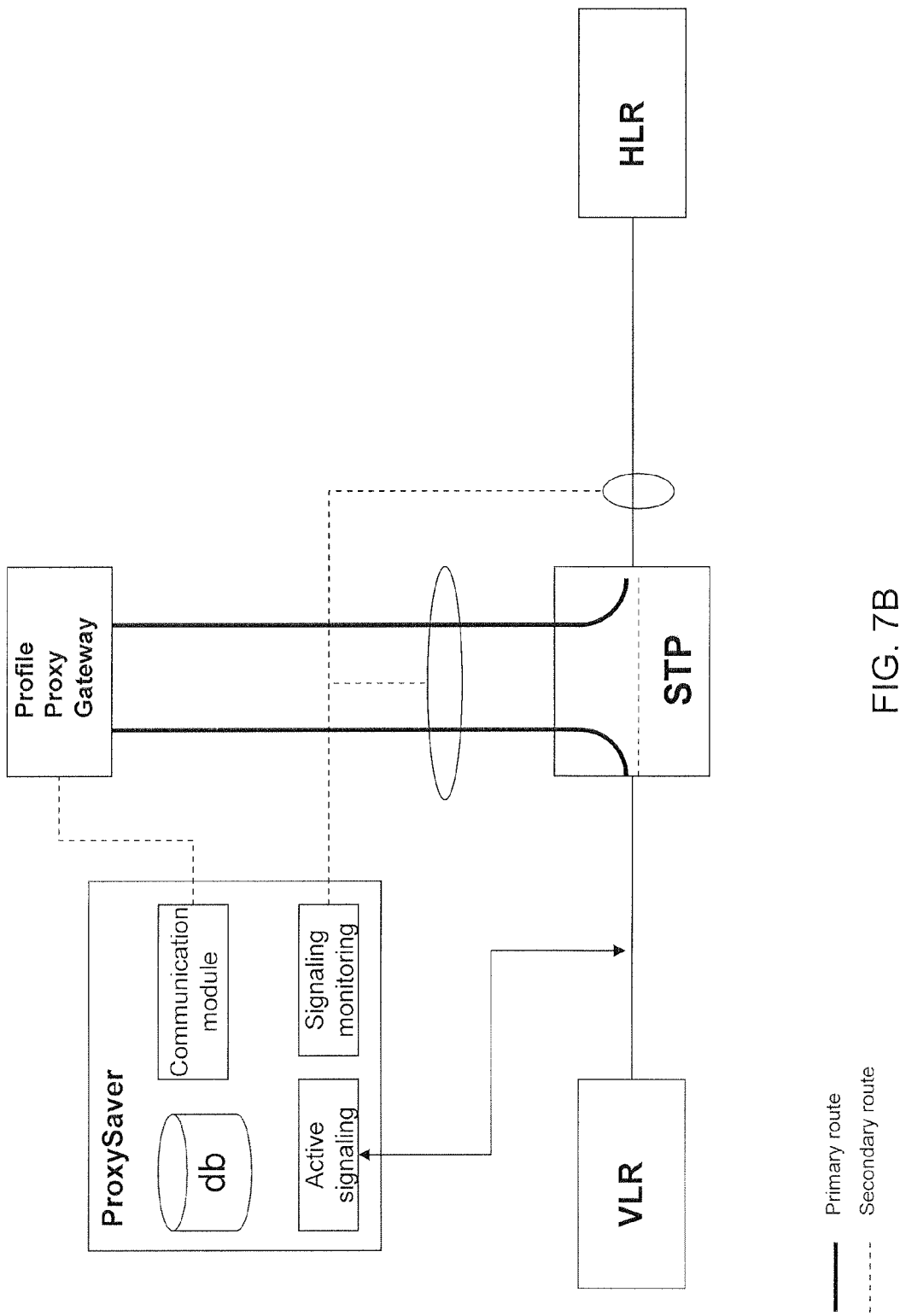
FIG. 7B illustrates an example Profile Proxy Gateway Generic Network Integration, in accordance with aspects of the present invention.

FIGS. 7A and 7B illustrate this mechanism.

Method 2: UL Induction (ProxySaver Initiated)

The objective of this operation is to modify the VLR and MSC address stored in the HLR.

Figure 8:
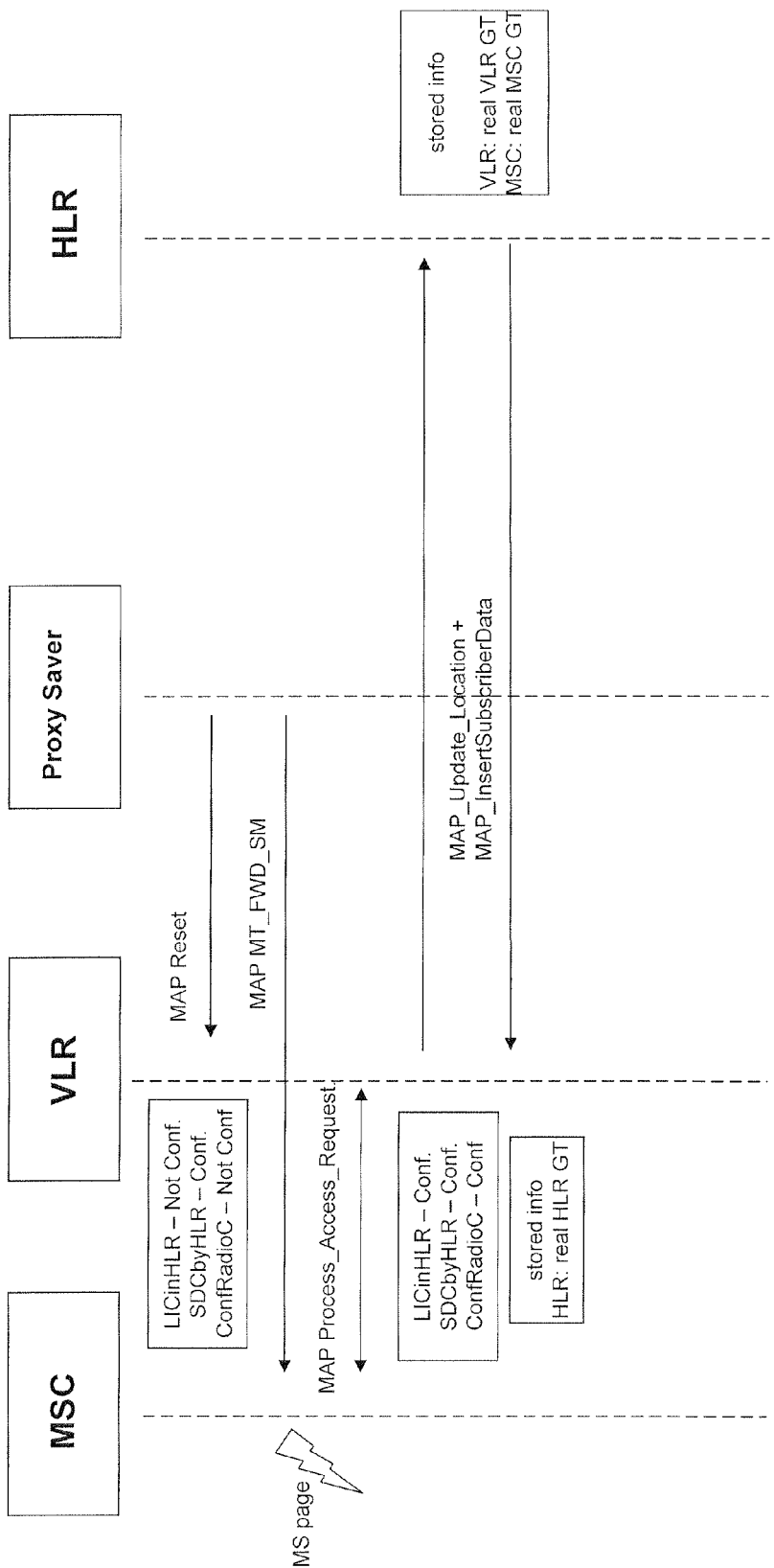
FIG. 8 illustrates an example ProxySaver-initiated HLR restoration procedure, in accordance with aspects off the present invention.

When needed, the ProxySaver fires a MAP RESET message to the real VLR hosting the end-user. Subsequently, the ProxySaver sends a MAP_MT_FORWARD_SM or MAP_PROVIDE_SUBSCRIBER_LOCATION or MAP_PROCESS_UNSTRUCTURED_SS_REQUEST to the real MSC. A paging occurs then and upon successful paging procedure completion, a MAP_PROCESS_ACCESS_REQUEST is sent from the MSC to the VLR. Consequently, the VLR checks at reception of the MAP_PROCESS_ACCESS_REQUEST the state of the "Location Information Confirmed in HLR". As the flag was set to "Not Confirmed" at the MAP_RESET reception, the VLR initiates an Update Location procedure which results in the recording of the actual VLR/MSC address information in the HLR and refreshes the actual HLR address information in the VLR. FIG. 8 illustrates this mechanism.

The above two methods may also be used in case of Dummy GT integration. However in this case it only guarantees that MT activity is restored.

ProxySaver Introduction and Handshaking

The ProxySaver is independent from the Profile Proxy Gateway. In order to avoid any disruptive action from the ProxySaver, a handshake mechanism is available between the two entities. It enables the Gateway to inform the ProxySaver about its state.

Detection of Problem

The detection of a Gateway failure is based on two approaches. The Gateway itself may detect itself is malfunction and inform the ProxySaver through their communication link. The ProxySaver also monitors the links between the connected to the Gateway and may identify a service malfunction (no messages, one way messaging, etc.)

Resolution of Problem

Once the failure is detected, the ProxySaver parses its database contained all the profiles of the proxied-users. It then applies the most appropriate method, as described earlier, for restoring the end-user services.

Procedure Optimization

In the course of the restoration procedures for the complete set of end-user stored in its internal database, the ProxySaver continues to monitor the Update Location activity between the STP and the HLR. It can thereby detect any Location Update triggered by a natural movement of the end-user. Upon success of this mobile-initiated procedure, it may remove the corresponding end-user from the set of users to be restored. Therefore, by identifying these end-users that performs a MS-initiated Location Update, the system optimizes the recovery procedure and delay.

While the present invention has been described in connection with various aspects of the present invention, it will be understood by those skilled in the art that variations and modifications of the aspects of the present invention described above may be made without departing from the scope of the invention. Other aspects will be apparent to those skilled in the art from a consideration of the specification or from a practice of the invention disclosed herein.

APPENDIX

| Acronym | Description |
| --- | --- |
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CgPA | Calling Party Address |
| CLI | Calling Line Identification |
| CSD | Circuit Switched Data |
| CSI | Camel Subscription Information |
| DPC | Destination Point Code |
| ERB | CAP Event Report Basic call state model |
| FPMN | Friendly Public Mobile Network |
| FTN | Forward-To-Number |
| GLR | Gateway Location Register |
| GMSC | Gateway MSC |
| GMSC-F | GMSC in FPMN |
| GMSC-H | GMSC in HPMN |
| GPRS | General Packet Radio System |
| GSM | Global System for Mobile |
| GSM SSF | GSM Service Switching Function |
| GsmSCF | GSM Service Control Function |
| GT | Global Title |
| HLR | Home Location Register |
| HLR-F | FPMN HLR |
| HLR-H | HPMN HLR |
| HPMN | Home Public Mobile Network |
| GTT | Global Title Translation |
| IAM | Initial Address Message |
| IDP | Initial DP IN/CAP message |
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| ISC | International Service Carrier |
| ISD | MAP Insert Subscriber Data |
| ISG | International Signal Gateway |
| ISTP | International STP |
| ISTP-F | ISTP connected to FPMN STP |
| ISTP-H | ISTP connected to HPMN STP |
| ISUP | ISDN User Part |
| ITR | Inbound Traffic Redirection |
| IVR | Interactive Voice Response |
| LU | Location Update |
| LUP | MAP Location Update |
| MAP | Mobile Application Part |
| MCC | Mobile Country Code |
| MCC | Mobile Country Code |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MO | Mobile Originated |
| MSC | Mobile Switching Center |
| MSISDN | Mobile Station International Subscriber Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |
| MT | Mobile Terminated |
| MTP | Message Transfer Part |
| NDC | National Dialing Code |
| NP | Numbering Plan |
| NPI | Numbering Plan Indicator |
| O-CSI | Originating CAMEL Subscription Information |

APPENDIX-continued

| Acronym | Description |
| --- | --- |
| OCN | Original Called Number |
| ODB | Operator Determined Barring |
| OTA | Over The Air |
| PRN | MAP Provide Roaming Number |
| PSI | MAP Provide Subscriber Information |
| RDN | ReDirecting Number |
| RI | Routing Indicator |
| RNA | Roaming Not Allowed |
| RR | Roaming Restricted due to unsupported feature |
| RRB | CAP Request Report Basic call state model |
| SCCP | Signal Connection Control part |
| SCP | Signaling Control Point |
| SCP-H | HPMN SCP |
| SG | Signaling Gateway |
| SGSN | Serving GPRS Support Node |
| SGSN-F | FPMN SGSN |
| SIM | Subscriber Identity Module |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPMN SMSC |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TCAP | Transaction Capabilities Application Part |
| T-CSI | Terminating CAMEL Service Information |
| TP | SMS Transport Protocol |
| TR | Traffic Redirection |
| TT | Translation Type |
| UD | User Data |
| UDH | User Data Header |
| UDHI | User Data Header Indicator |
| USSD | Unstructured Supplementary Service Data |
| VAS | Value Added Service |
| VLR | Visited Location Register |
| VLR-F | FPMN VLR |
| VLR-H | HPMN VLR |
| VLR-V | VPMN VLR |
| VMSC | Visited Mobile Switching Center |
| VMSC-F | FPMN VMSC |
| VMSC-H | HPMN VMSC |
| VMSC-V | VPMN VMSC |
| VPMN | Visited Public Mobile Network |
| ATI | Access Transport Information |
| USI | User Service Information |
| WAP | Wireless Access Protocol |

RIS: Roaming Intelligence System
EU: European Union
GTP: GPRS Tunnel Protocol
PDP: Protocol Data Packet
BOIC: Barring Outgoing International Calls
BOIC-Ex-Home: Barring Outgoing International Calls except to home country
SoR: Steering of Roaming
Technical References (Each of which is Incorporated by Reference in its Entirety):
GSM 902 on MAP specification
Digital cellular telecommunications system (Phase 2+); Mobile Application Part (MAP) Specification (3GPP TS 09.02 version 7.9.0 Release 1998)
GSM 378 CAMEL Architecture, Release 1998
GSM 978 CAMEL Application Protocol, Release 1998
GSM 340 on SMS
Digital cellular telecommunications system (Phase 2+); Technical realization of the Short Message Service (SMS); (GSM 03.40 version 7.4.0 Release 1998)
Q1214-Q1218 on Intelligent Networks
Q701-704 on SS7 MTP
Q711-Q714 on SS7 SCCP
TD.35 NRTRDE Format for Fraud information
FF.18 NRTRDE Business Requirements
ETSI CS domain charging documents: TS12.05, TS 32.005, TS 32.205, TS 32.298
ETSI Restoration Procedures: TS123.007
ETSI PS domain charging documents: TS12.15, TS 32.015, TS 32.215, TS 32.298
ETS 300 374-1 Intelligent Network (IN); Intelligent Network Capability Set 1 (CS1); Core Intelligent Network Application Protocol (INAP); Part 1: Protocol specification
EN 301 140-1 Intelligent Network (IN); Intelligent Network Application Protocol (INAP); Capability Set 2 (CS2); Part 1: Protocol specification
Jiang DCG 2005 Dynamic originating CAMEL approach for Implementing Call Control Services for Inbound Roamers, U.S. Provisional Patent Application Ser. No. 60/679,444;
Jiang 2005 Anti-Steering Patent Filing
Jiang 2005 Anti-Anti-Steering, Patent filing
Jiang 2005 Inbound Traffic Steering, Patent filing
Jiang 2005 Anti-inbound traffic steering from HPMN and VPMN, Patent filing
Jiang et al 2003 [TR 2003] Cellular Network Traffic Redirection
David Gillot, John Jiang, [RIS 2007] Roaming Intelligence System
David Gillot and John Jiang [RTRDE 2007] Real time roaming data exchange
John Jiang [PI 2007] A single operator and network side solution for inbound and outbound roaming tests and discoveries of roaming partner services and frauds without involving remote probes or real roamer traffic—Phase 1
GSM 379 on CAMEL Support of Optimal Routing (SOR)
GSM 318 Basic Call Handling
GSM 23018 Basic Call Handling
GSM 23081 Line identification service
GSM 23116 Super Charger Function
ITU-T Recommendation Q.1214 (1995), Distributed functional plane for intelligent network CS-1;
ITU-T Recommendation Q.1218 (1995), Interface Recommendation for intelligent network CS-1;
ITU-T Recommendation Q.762 (1999), Signaling system No. 7—ISDN user part general functions of messages and signals;
ITU-T Recommendation Q.763 (1999), Signaling system No. 7—ISDN user part formats and codes;
ITU-T Recommendation Q.764 (1999), Signaling system No. 7—ISDN user part signaling procedures;
ITU-T Recommendation Q.766 (1993), Performance objectives in the integrated services digital network application;
ITU-T Recommendation Q.765 (1998), Signaling system No. 7—Application transport mechanism;
ITU-T Recommendation Q.769.1 (1999), Signaling system No. 7—ISDN user part enhancements for the support of Number Portability
BA 19 GSMA RAEX on AA 14 and IR 21
FF 17 International Revenue Share Fraud

What is claimed is:

1. A method for ensuring restoration of Mobile-Originated (MO) and Mobile-Terminated (MT) services to an end-user of a network operator upon failure of a Proxy Profile Gateway, the method comprising:

determining a failure of the Proxy Profile Gateway, the failure rendering the Proxy Profile Gateway unavailable;

tracking, by a Proxy Saver, an actual location of the end-user by monitoring roaming signaling links between the Proxy Profile Gateway and all network end nodes;

removing, based on the tracking, the end-user from a list of end-users identified for restoration of MO and MT services when the restoration is no longer necessary based on a mobile-initiated procedure;

initiating restoration of MT and MO services to the end-user based on refreshing the actual location of the end-user in a stored profile at the Proxy Profile Gateway; and monitoring the initiated restoration.

2. The method of claim 1, wherein the failure of the Proxy Profile Gateway is detected via a handshake mechanism.

3. The method of claim 1, wherein monitoring the initiated restoration further comprises:

upon detecting restoration failure, re-initiating the restoration.

4. A system for ensuring restoration of Mobile-Originated (MO) and Mobile-Terminated (MT) services to an end-user of a network operator upon failure of a Proxy Profile Gateway, the system comprising:

means for determining a failure of the Proxy Profile Gateway, the failure rendering the Proxy Profile Gateway unavailable;

means for tracking, by a Proxy Saver, an actual location of the end-user by monitoring roaming signaling links between the Proxy Profile Gateway and all network end nodes;

means for removing, based on the tracking, the end-user from a list of end-users identified for restoration of MO and MT services when the restoration is no longer necessary based on a mobile-initiated procedure;

means for initiating restoration of MT and MO services to the end-user based on refreshing the actual location of the end-user in a stored profile at the Proxy Profile Gateway; and means for monitoring the initiated restoration.

5. The system of claim 4, wherein the failure of the Proxy Profile Gateway is detected via a handshake mechanism.

6. The system of claim 4, wherein the means for monitoring the initiated restoration further comprises:

upon detecting restoration failure, re-initiating the restoration.

7. A system for ensuring restoration of Mobile-Originated (MO) and Mobile-Terminated (MT) services to an end-user of a network operator upon failure of a Proxy Profile Gateway, the system comprising:

a processor;

a user interface functioning via the processor; and a repository accessible by the processor;

wherein a profile of the end-user is stored in the data repository; and wherein the processor is configured to:

determine a failure of the Proxy Profile Gateway, the failure rendering the Proxy Profile Gateway unavailable;

track an actual location of the end-user by monitoring roaming signaling links between the Proxy Profile gateway and all network end nodes;

remove, based on the tracking, the end-user from a list of end-users identified for restoration of MO and MT services when the restoration is no longer necessary based on a mobile-initiated procedure;

initiate restoration of MT and MO services to the end-user based on refreshing the actual location of the end-user in the stored profile; and monitor the initiated restoration.

8. The system according to claim 7, wherein the processor is housed on a terminal.

9. The system according to claim 7, wherein the terminal is selected from a group consisting of a personal computer, a minicomputer, a main frame computer, a microcomputer, a hand-held device, and a telephonic device.

10. The system according to claim 7, wherein the processor is housed on a server.

11. The system according to claim 10, wherein the repository is housed on a server.

12. The system according to claim 10, wherein the server is coupled to a network.

13. The system according to claim 12, wherein the network is the Internet.

14. A computer program product comprising a computer-executable program tangibly embodied on a non-transitory computer readable medium therein for causing a computer to ensure restoration of Mobile-Originated (MO) and Mobile-Terminated (MT) services to an end-user of a network operator upon failure of a Proxy Profile Gateway, the control logic comprising:

first computer-readable program code for detecting failure of the Proxy Profile Gateway, the failure rendering the Proxy Profile Gateway unavailable;

second computer-readable program code for tracking, by a Proxy Saver, an actual location of the end-user by monitoring roaming signaling links between the Proxy Profile Gateway and all network end nodes;

third computer-readable program code for removing, based on the tracking, the end-user from a list of end-users identified for restoration of MO and MT services when the restoration is no longer necessary based on a mobile-initiated procedure;

fourth computer-readable program code for initiating restoration of MT and MO services to the end-user based on refreshing the actual location of the end-user in a stored profile at the Proxy Profile Gateway; and fifth computer-readable program code for monitoring the initiated restoration.

15. The system of claim 14, wherein the failure of the Proxy Profile Gateway is detected via a handshake mechanism.

16. The system of claim 14, wherein the fifth computer-readable program code for monitoring the initiated restoration further comprises:

upon detecting restoration failure, re-initiating the restoration.

\* \* \* \* \*